(12) United States Patent
Keeler

(10) Patent No.: US 6,808,035 B1
(45) Date of Patent: *Oct. 26, 2004

(54) TANDEM REAR AXLE SUSPENSIONS FOR TRUCKS AND TRUCK-TRACTORS

(75) Inventor: Michael J. Keeler, Black Lick, OH (US)

(73) Assignee: The Boler Company, Itasca, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 856 days.

(21) Appl. No.: 08/781,412

(22) Filed: Jan. 10, 1997

Related U.S. Application Data

(63) Continuation-in-part of application No. 08/606,058, filed on Feb. 23, 1996, now Pat. No. 5,649,719.

(51) Int. Cl.[7] .......................... B60G 5/00; B60G 11/27; B60G 17/052
(52) U.S. Cl. .................. 180/197; 180/24.02; 280/86.5; 280/683; 280/124.157
(58) Field of Search ................................ 280/676, 683, 280/685, 704, 713, 711, 688, 124.116, 124.157, 86.5; 180/24.02, 197, 352, 378, 349

(56) References Cited

U.S. PATENT DOCUMENTS

| | | | |
|---|---|---|---|
| 2,750,200 A | | 6/1956 | Scheel |
| 2,934,351 A | * | 4/1960 | Masser ........................ 280/683 |
| 3,406,983 A | * | 10/1968 | Masser ........................ 280/713 |
| 3,630,541 A | | 12/1971 | Carlson et al. |
| 3,921,999 A | * | 11/1975 | Masser ........................ 280/676 |
| 3,948,334 A | | 4/1976 | Danielson et al. |
| 4,165,884 A | * | 8/1979 | Allison et al. .............. 280/704 |
| 4,166,640 A | | 9/1979 | Van Denberg |
| 4,309,045 A | | 1/1982 | Raidel |
| 4,504,079 A | | 3/1985 | Strong |
| 4,553,773 A | * | 11/1985 | Pierce ........................ 280/676 |
| 4,596,402 A | | 6/1986 | Raidel |
| 4,900,057 A | * | 2/1990 | Raidel ........................ 280/713 |
| 5,037,126 A | | 8/1991 | Gottschalk et al. |
| 5,366,237 A | | 11/1994 | Dilling et al. |
| 5,458,359 A | * | 10/1995 | Brandt ........................ 180/378 |
| 5,549,320 A | * | 8/1996 | Ellingsen .................... 280/683 |
| 5,649,719 A | * | 7/1997 | Wallace et al. ............. 280/713 |

OTHER PUBLICATIONS

"Trailing Axle Air Ride Suspension", Ridewell Corp. Brochure, Apr. 1990.*
Hendrickson Tandem Axel Units—Jan. 18, 1978.
Heavy Truck Traction—Mar. 11, 1983.
Iowa Testing Antilock System "Spinoff"—New Traction Control—Date N/A.
Electronic Traction Controls—Detroit Automotive—Date N/A.
Electronic Traction Controller Systems Stop Spinout—Detroit Automotive—Date N/A.
More Traction for Less Truck Cost & Weight—Detroit Automotive /Granning Suspensions—Date Nov. 1976.

* cited by examiner

*Primary Examiner*—Peter C. English
(74) *Attorney, Agent, or Firm*—Cook, Alex, McFarron, Manzo, Cummings & Mehler, Ltd.

(57) ABSTRACT

Tandem rear axle air suspensions for trucks and truck-tractors wherein a non-reactive, roll compliant drive axle suspension equipped with wheel slip sensing and control apparatus is combined with a roll stable, non-drive tag or pusher axle suspension equipped with apparatus for transferring weight to the drive axle suspension. The preferred technology for the non-drive tag or pusher axle suspension is a rigid beam suspension. The wheel slip sensing and control apparatus and the weight transfer apparatus may be either automatically or manually operated.

8 Claims, 4 Drawing Sheets

FIG.2

TANDEM REAR AXLE SUSPENSIONS FOR TRUCKS AND TRUCK-TRACTORS

This application is a continuation-in-part of application Ser. No. 08/606,058 filed Feb. 23, 1996, U.S. Pat. No. 5,649,719 dated Jul. 22, 1997.

FIELD OF THE INVENTION

This invention relates generally to innovations and improvements in tandem rear axle air suspensions for trucks and truck-tractors. More particularly, the invention relates to such suspensions wherein a non-reactive, roll compliant drive axle suspension having a single axle and equipped with wheel slip sensing and control means is combined with a roll stable, non-drive tag or pusher axle suspension having a single axle and equipped with means for transferring weight to the drive axle suspension. The preferred technology for the non-drive tag or pusher axle suspension is a rigid beam suspension. The wheel slip sensing and control means and the weight transfer means may be either automatically or manually operated. When the drive axle suspension is in the lead or forward position the combination is referred to as a "drive/tag" suspension. When the drive axle suspension is in the rear or trailing position the combination is referred to as a "drive/pusher" suspension. The term "non-reactive" means that the suspension does not react appreciably to torque forces applied to a drive axle, primarily during acceleration. Being non-reactive substantially eliminates driveline torque induced problems. The term "roll compliant" means that a suspension does not adequately resist the tendency of a vehicle to roll when negotiating sharp turns. On the other hand, a non-reactive suspension has excellent traction characteristics when encountering uneven road conditions due to its roll compliance. The term "roll stable" means the opposite of "roll compliant." The term "air suspension" refers to a suspension equipped with air springs or bellows for supporting a vehicle on an axle. Hydraulic cylinders with accumulators may be used as the functional equivalent of air springs.

BACKGROUND OF THE INVENTION

Rear axle suspensions form important components of heavy duty, over-the-road trucks and truck-tractors, with respect to the operating characteristics, original costs and maintenance of such vehicles. Accordingly, it is desirable to provide such rear axle suspensions which have optimum operating characteristics combined with minimum weight and costs of production and maintenance. It has been found in accordance with the present invention that such objectives can be achieved by providing tandem rear axle air suspensions which combine a non-reactive, roll compliant drive axle suspension having a single axle with a roll stable, non-drive tag or pusher axle suspension having a single axle of the rigid beam type. Preferably, the drive axle suspension is equipped with automatically operable wheel slip sensing and control means of known type while the non-drive tag or pusher axle suspension is provided with automatically operable means of known type for transferring weight from the tag or pusher axle suspension to the drive axle suspension.

Heretofore, tandem rear axle suspensions for trucks and truck-tractors have been available combining a drive axle suspension and a non-drive tag or pusher axle suspension having automatically operating wheel slip or spin sensing and control means for the drive axle suspension and automatically operable weight transfer means for the tag or pusher axle suspension. Furthermore, roll compliant, non-reactive drive axle suspensions have been available as well as roll stable non-drive tag or pusher axle suspensions of the rigid beam type. However, tandem rear axle suspensions have not been previously known or available combining a non-reactive, roll compliant drive axle suspension having a single axle with a roll stable non-drive tag or pusher axle suspension having a single axle of the rigid beam type, either with or without wheel slip sensing and control means or weight transfer means. Such novel combinations of non-reactive, roll compliant drive axle suspensions having single axles and roll stable tag or pusher axle suspensions having single axles of the rigid beam type are now provided in accordance with the present invention.

For a more complete understanding of the nature and scope of the invention reference may now be had to the following detailed description of a presently preferred embodiment of the invention taken with the accompanying drawings wherein:

BRIEF DESCRIPTION OF THE DRAWINGS

FIG. 2 is a top plan view of the suspension shown in FIG. 1; and

DESCRIPTION OF THE PREFERRED EMBODIMENTS

Figure 1:
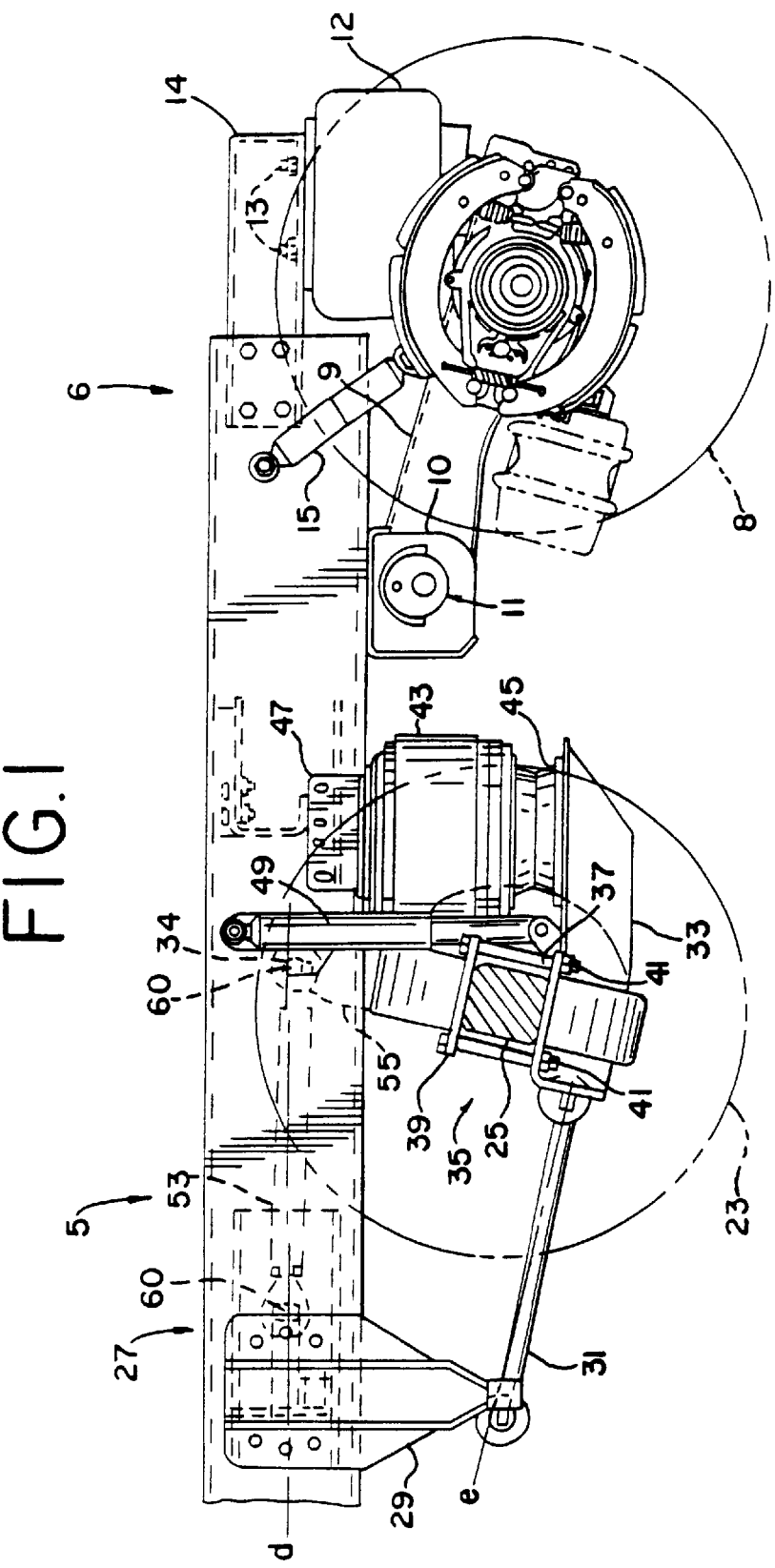
FIG. 1 is a side elevational view of a tandem rear axle suspension for a heavy duty truck or truck-tractor forming an embodiment of the invention, with certain automatically operable control equipment omitted and with certain parts shown in phantom.
Figure 2:
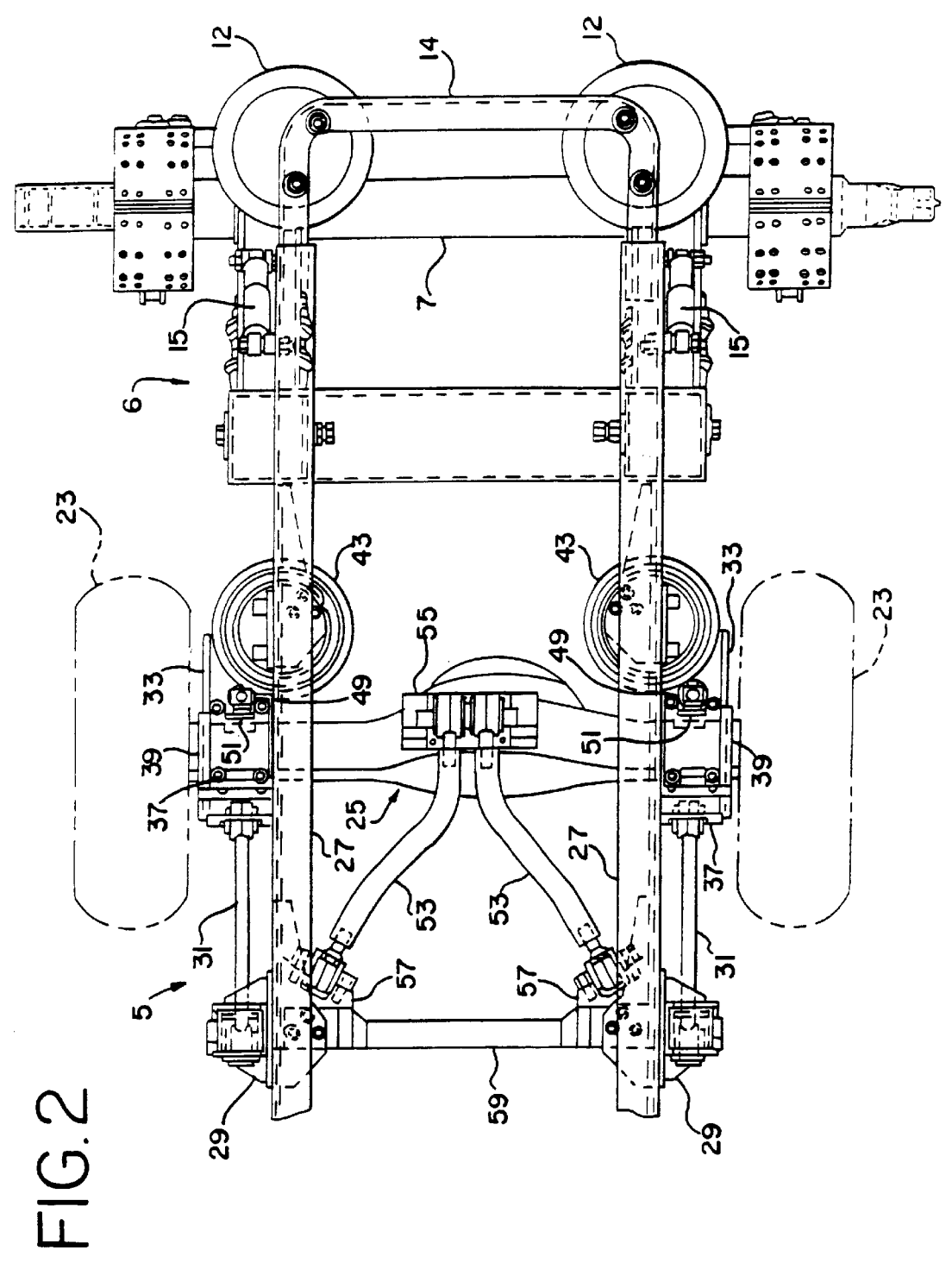

Referring to the drawings, in FIGS. 1 and 2 a non-reactive, roll compliant drive axle suspension having a single axle 25 is indicated generally at 5 while a roll stable non-drive tag axle suspension of the rigid beam type having a single axle 7 is indicated generally at 6. The non-reactive, roll compliant drive axle suspension 5 may correspond to the non-reactive, roll compliant drive axle suspension shown in FIGS. 2–4 of co-pending application Ser. No. 08/606,058 filed Feb. 23, 1996, U.S. Pat. No. 5,649,719 dated Jul. 22, 1997, and assigned to the assignee of the present invention. Such application and the disclosure thereof are incorporated by reference herein. The roll stable non-drive tag axle suspension 6 corresponds generally to the non-drive trailer suspension axle shown and described in connection with FIGS. 9 and 10 of U.S. Pat. No. 5,366,237 dated Nov. 22, 1994 and assigned to the assignee of the present invention the disclosure of which is incorporated by reference herein.

The suspension 5 is supported on ground wheels 23—23 shown in broken line and mounted on the opposite ends of a drive axle indicated generally at 25. Usually, the wheels 23 will be in the form of dual-wheels with tires. The components of the suspension 5 on opposite sides of the vehicle are the same. The frame or chassis of the vehicle is represented by fore-and-aft side frame members 27. Hangers 29 are suitably mounted on the outer sides of the side frame members 27 so as to have pivotally connected thereto in known manner the forward ends of lower control rods 31—31. The rearward ends of the control rods 31 are pivotally connected to axle seats 33 so that control rods 31 are in an upwardly inclined orientation in the forward direction as shown in FIG. 1. This orientation minimizes the effect that the suspension has on drive axle pinion change during articulation. The pivotal connections at opposite ends of the control rods 31 are such that they pivot in vertical planes parallel to the side frame members 27.

The opposite ends of the axle 25 are rigidly attached to the axle seats 33 by axle attachment assemblies indicated generally at 35. Each assembly 35 comprises four bolts 37 which extend through registering holes in an axle seat 33 and the four corners of a top plate 39. Thus, the axle 25 is sandwiched and confined at each end between a top plate 39 and an axle seat 33 with a pair of the bolts 37 on opposite sides. Lock nuts 41 on the lower ends of each of the bolts 37 secure each of the assemblies 35 together.

On each side of the suspension 5 an air spring 43 of known type is bolted at its base 45 to the adjacent axle seat 33. The top of each air spring 43 is bolted to the lower horizontal leg of an L-shaped bracket 47 the vertical leg of which is bolted to the side of the adjacent frame member 27. The suspension 5 is also provided on each side with a shock absorber 49. The bottom end of each shock absorber 49 is pivotally mounted on the top of an axle seat 33 while the top end is pivotally connected to the adjacent side frame member 27 by a shock absorber bracket 51 which is bolted to the adjacent side of a side frame member 27.

A pair of upper control rods 53—53 are provided which are pivotally connected at their rear ends at points 34 to an axle mount 55 located on top of the axle 25. Each of the control rods 53 is pivotally attached at its forward end to a bracket 57 which in turn is fastened to the inner side of the adjacent side frame member 27 and also to the rear side of an adjacent frame cross member 59. By means of this arrangement, each upper control rod 53 moves in its own vertical plane with the planes diverging forwardly from the mount 55 and forming angles with the side frame members 27.

Referring to FIG. 1, the ideal orientation of lower control rods 31 is such that their rearward ends travel through arcs that, if extended, would pass through a horizontal line running through connection points 34 and perpendicular to side frame member 27. Generally horizontal line d is drawn extending longitudinally through the pivot centers 60 of upper control rods 53. Similarly, line e is drawn extending longitudinally through lower control rods 31.

With the lower and upper pairs of control rods 31—31 and 53—53, respectively, pivoted at their opposite ends the axle 25 is prevented from twisting appreciably and the suspension is thereby rendered non-reactive to torque. The arrangement also allows suspension displacement caused by the encounter of a surface bump or depression by one tire to be more independent of the opposite side of the suspension and thereby improve traction of the tire on the opposite side of the suspension. Since the suspension 5 does not include the usual main support of a trailing arm suspension in the form of a Z-spring or goose neck main support member, the suspension 5 provides both cost and weight savings, making it a more efficient and effective form of suspension.

By equipping the tandem axle suspension of the present invention with known and commercially available spin-out control and weight transfer systems, a non-drive tag or pusher axle suspension, exemplified by the tag axle suspension 6, may be combined with the drive axle suspension 5 so as to provide an overall suspension which has excellent operating characteristics and is also weight and cost efficient.

While the drive axle suspension 5 is subject to the disadvantage of having low roll stability characteristics, and is therefore referred to as "roll compliant," this disadvantage is compensated for by the roll stiffness characteristics of the tag axle suspension 6. For a detailed description of the tag axle suspension 6 reference may be had to the above-mentioned U.S. Pat. No. 5,366,237 the disclosure of which is incorporated by reference herein. U.S. Pat. No. 5,366,237 in turn incorporates by reference the disclosure contained in U.S. Pat. No. 4,166,640. The suspension 6 has an axle 7 with ground wheels 8 mounted on opposite ends thereof. The axle 7 is rigidly mounted on the trailing ends of rigid beams 9—9 which are pivotally mounted at their leading or forward ends on hanger brackets 10. The pivotal connections between the rigid beams 9 and the hanger brackets 10 are indicated generally at 11 and include a bushing member corresponding to the bushing member 63 shown in FIG. 10 of U.S. Pat. No. 5,366,237 and shown and described in greater detail in connection with FIGS. 5–8 of U.S. Pat. No. 4,166,640. This form of resilient connection between the forward end of a rigid beam 9 and the hanger bracket 11 is sufficiently resilient to allow operative deflections in response to the articulation forces and at the same time restrain longitudinal movement sufficiently to maintain substantially constant the distance between the hanger bracket 11 and the axle connecting means.

The support for the suspension 6 is provided by airbags or bellows 12 mounted on the rear or trailing ends of the beams 9 and attached at their top ends by means of bolts 13 to a C-shaped rear cross member 14 (FIG. 2) mounted on and extending rearwardly beyond the rear ends of the side frame members 27.

Having the air springs 12 located close to and above the axle 7 provides two advantages. First, the frame of the suspension can be shortened, which reduces both cost and weight. Second, the air springs 12 are located forwardly of the rear of the tires 8 so as to be protected by the tires against damage when the vehicle is being backed up without a trailer being attached.

The suspension 6 includes a pair of shock absorbers 15—15 pivotally connected at their lower ends on the tops of the rigid beams 9 and pivotally connected at their upper ends to the adjacent frame member 27.

The roll compliant drive axle suspension 5 and the roll stiff tag axle suspension 6 together provide a combined roll stiffness that is adequate and desirable and at the same time maximizes the traction characteristics of the overall suspension when operating on a less than desirable terrain. In common with trailing arm air suspensions, generally, as roll stiffness is increased, the suspension capability to accommodate side-to-side road irregularities decreases. This is due to the load transfer from one end of an axle to the other as one end is lifted relative to the other. However, the decreased ability of the tag axle suspension 6 to accommodate side-to-side road irregularities is not important since it is not a drive axle. The roll compliance of the non-reactive drive axle suspension 5 minimizes the effect of side-to-side road irregularities on traction efforts. Therefore, the combination of suspensions maximizes traction characteristics while providing adequate roll stiffness.

The tandem rear axle suspension of the present invention illustrated by the embodiment shown in FIGS. 1 and 2 described in connection therewith is adapted to be equipped with commercially available systems for sensing and controlling wheel slip to which the drive axle suspension 5 is subject and for transferring weight from the tag axle suspension 6 to the drive axle suspension 5 so as to increase the traction effort capability of the drive axle. One such control system that is known and has been commercially available is the ELECTRAC™ control system available from the Detroit Automotive division of Aspro, Inc. of Warren, Mich. Such a system as applied to the tandem rear axle suspension of FIGS. 1 and 2 is illustrated diagrammatically in FIG. 3.

Figure 3:
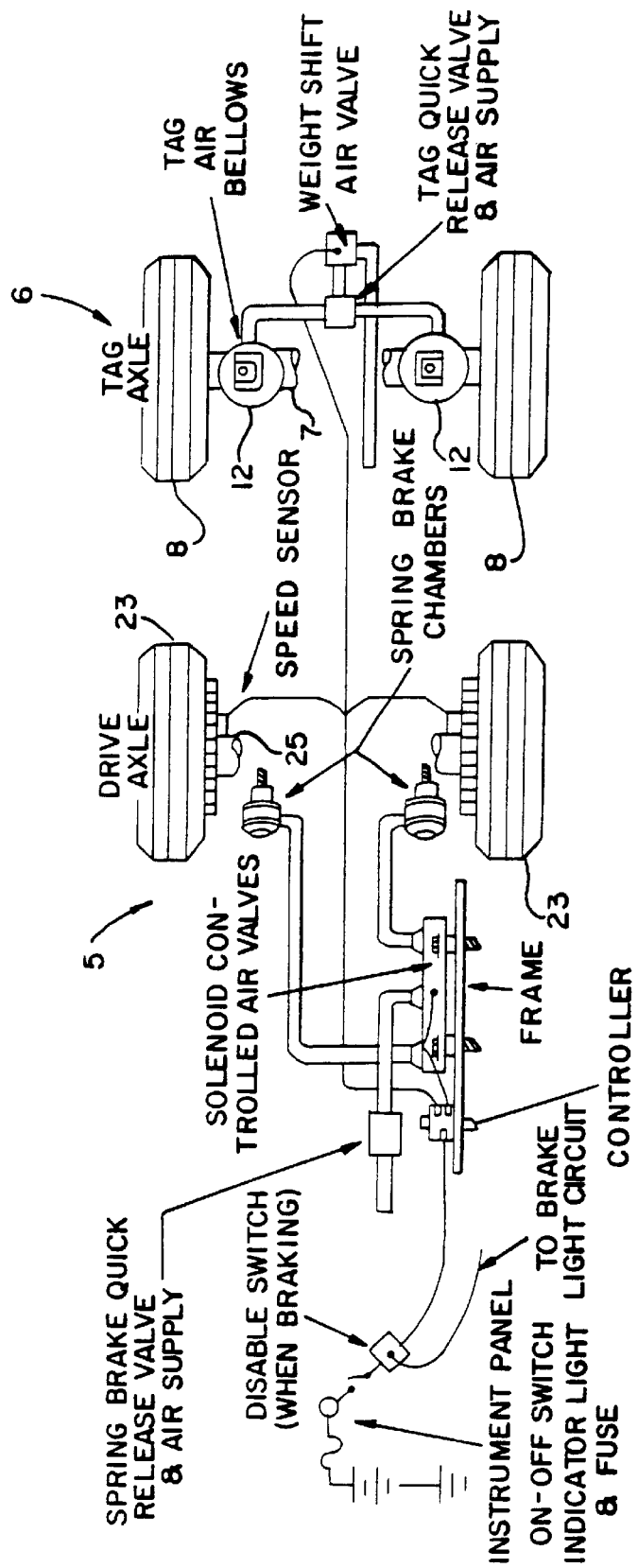
FIG. 3 is a diagrammatic view illustrating the application of automatically operable wheel slip sensing and control means and automatically operable weight transfer means to the tandem rear axle suspension of FIGS. 1 and 2.

The manner in which the wheel slip sensing and control and weight transfer systems operate will be apparent to those skilled in the art from the legends applied in FIG. 3. The automatically operable systems utilize the spring-brake air line on airbrake-equipped trucks and do not involve their service brake line. Each of the wheels 23 of the drive suspension 5 is provided with a wheel speed sensor so that when one of the wheels starts to slip or spin the solenoid controlled air valve operates to release or exhaust some of the pressure so as to apply braking action to the wheel that is slipping or tending to spin. Thereupon, additional torque is applied to the non-spinning wheel so as to provide the necessary traction to allow the vehicle to proceed. As indicated, the solenoid controlled air valves are in communication with the compressed air supply through the spring brake quick release valve.

The controller for the solenoid controlled air valve is connected with the instrument panel in the cab through a disable switch so that during normal braking the wheel slip sensing and control system is automatically disabled.

The weight transfer system is also operable in conjunction with the wheel slip sensing and control means so as to release some of the air pressure within the air springs or air bellows 12 when one of the wheels 23 begins to slip. By releasing some of the air pressure in the air springs 12 the portion of the vehicle weight supported by the tag axle suspension 6 is reduced and automatically transferred to the drive axle suspension 5.

Once spin-out has been prevented the system returns to normal with the air pressure in the air springs 12 being restored to normal and the braking action on the axle 25 being removed, the pressure in the spring brake chambers being restored to normal.

Figure 1A:
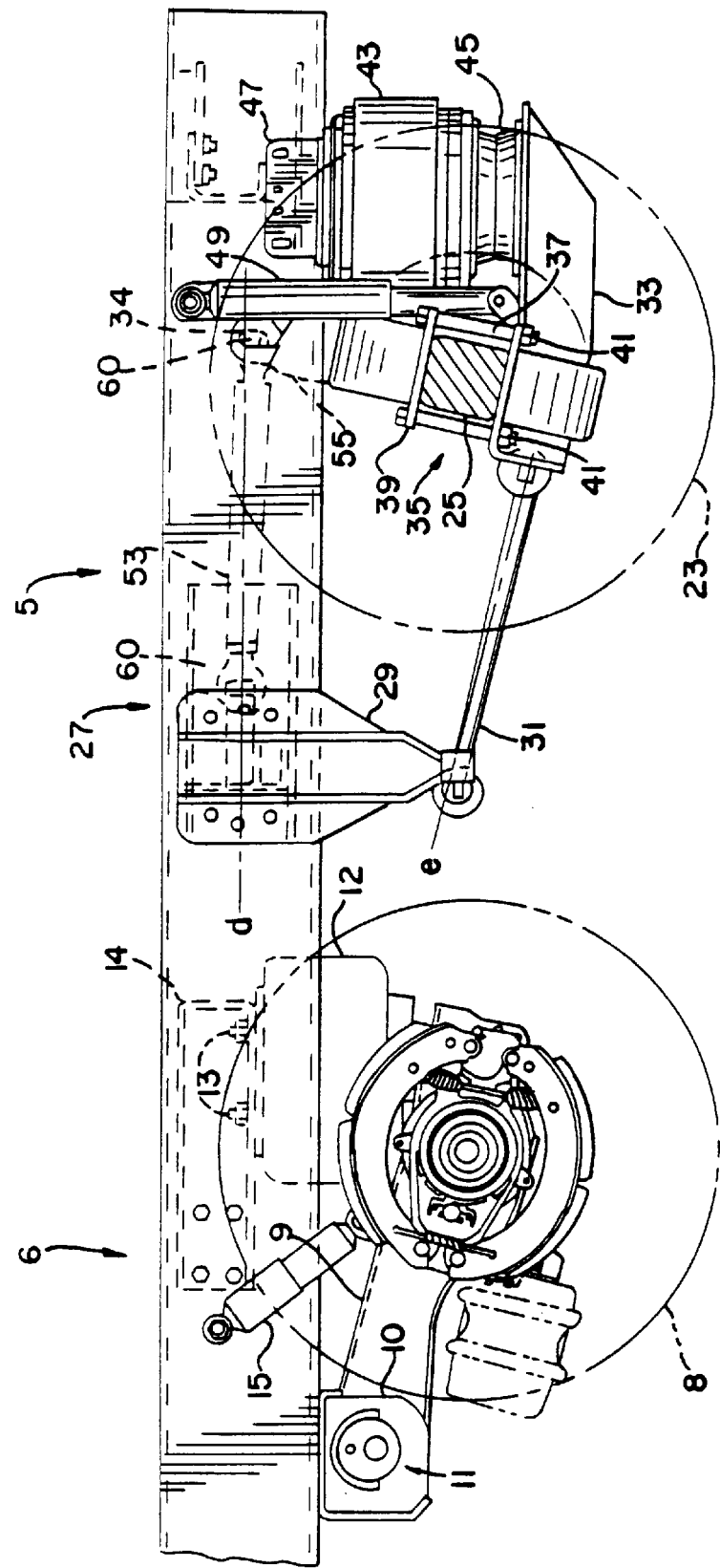
FIG. 1A is a side elevation view similar to FIG. 1 of another embodiment of the invention.

While the tandem rear axle suspension shown and described in connection with FIGS. 1–3 is of the drive/tag type, it will be understood that by reversing the positions of drive suspension 5 and the tag suspension 6 the suspension will become a drive/pusher suspension. This alternate embodiment of the invention is illustrated in FIG. 1A wherein the roll stable non-drive axle suspension 6 is located in front of the roll compliant drive axle suspension 5 so as to become a non-drive pusher axle suspension.

As an alternate to replacing the air springs 43 of the drive axle suspension 5 with hydraulic cylinders and accumulators, they may also be replaced with conventional leaf springs.

What is claimed is:

1. A tandem rear axle suspension for trucks and truck-tractors, comprising, in combination, a roll compliant drive axle suspension having a single axle, a roll stable non-drive tag axle or pusher axle suspension having a single axle and means for transferring weight from said tag axle suspension or said pusher axle suspension to said drive axle suspension.

2. The tandem rear axle suspension of claim 1 in which said roll compliant drive axle suspension is non-reactive.

3. The tandem rear axle suspension of claim 1 wherein said drive axle suspension includes wheel slip sensing and control means.

4. The tandem rear axle suspension of claim 1 wherein said means for transferring weight from said tag axle suspension or said pusher axle suspension to said drive axle suspension is automatically operable and wherein said drive axle suspension includes automatically operable wheel slip sensing and control means.

5. The tandem rear axle suspension of claim 4 in which said tag axle suspension is a rigid beam suspension or said pusher axle suspension is a rigid beam suspension.

6. The tandem rear axle suspension of claim 1 wherein each said suspension includes an air spring.

7. The tandem rear axle suspension of claim 6 wherein said drive axle suspension includes wheel slip sensing and control means.

8. The tandem rear axle suspension of claim 6 wherein said means for transferring weight from said tag axle suspension or said pusher axle suspension to said drive axle suspension is automatically operable and wherein said drive axle suspension includes automatically operable wheel slip sensing and control means.

* * * * *